Aug. 15, 1944.  J. M. KROYER  2,355,806
INTERNAL-COMBUSTION ENGINE
Filed April 1, 1942
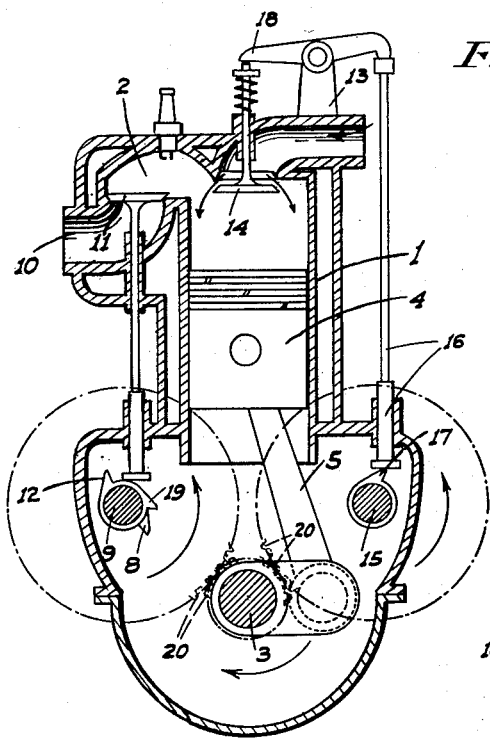
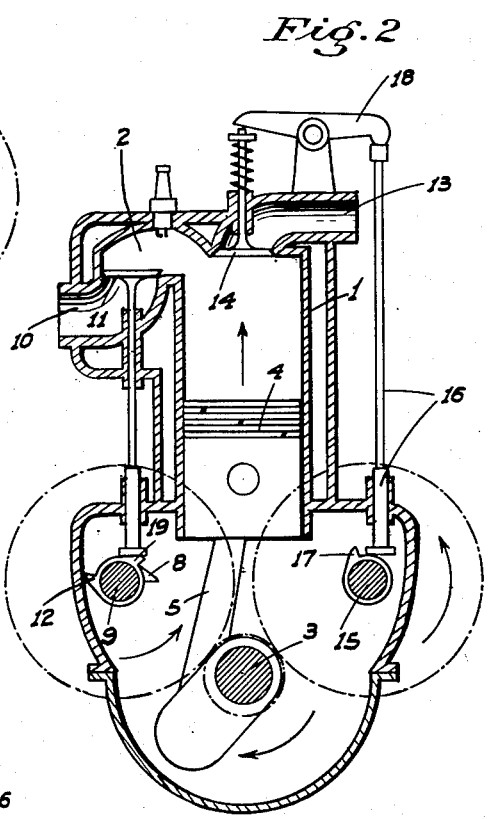
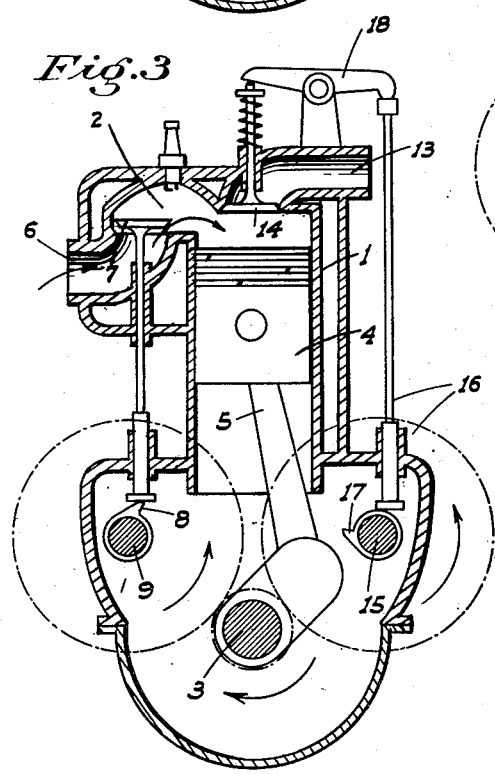
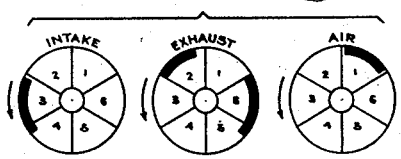
INVENTOR
J. M. Kroyer
ATTORNEYS Patented Aug. 15, 1944

2,355,806

UNITED STATES PATENT OFFICE 2,355,806

INTERNAL-COMBUSTION ENGINE

John M. Kroyer, Stockton, Calif., assignor of one-fourth to John O. Eccleston, Stockton, Calif.

Application April 1, 1942, Serial No. 437,102

1 Claim. (Cl. 123—64)

This invention relates to internal combustion engines of the gasoline burning, spark ignited type, such as are widely used in the automotive and aviation fields, my principal object being to increase the efficieency of engines of this general type.

Such engines as are now constructed and operated are very wasteful of power, especially when but a small portion of their possible power output is being used. The main reason for this is that a certain amount of dead and expanded gas remains in the cylinder after the exhaust stroke, and since the intake stroke in the conventional four-cycle engine follows immediately after the exhaust stroke, the fresh incoming charge is mixed with this dead residue, which is highly heated and already expanded and has no oxygen left therein. As a result, and since the volumetric capacity of the combustion chamber of the cylinder is constant, the total volume of fresh unexpanded oxygen-containing mixture is accordingly reduced and proportionately more contaminated, and the power output derived from the explosion and expansion of the mixture is correspondingly reduced. In other words, a quantity of fresh oxygen in the fuel mixture of an internal combustion engine is necessary to furnish the power, and hence such power is proportionate to the amount of fresh oxygen in the cylinder at the time of ignition of the mixture.

My invention contemplates drawing in and exhausting a full charge of fresh air immediately after the normal discharge or exhausting of the dead products of combustion, so as to not only thoroughly scavenge the cylinder and clean out the dead residue usually remaining, but to leave practically pure uncontaminated oxygen containing air in the cylinder at the start of the normal fire-mixture intake stroke. The power output when the mixture is then ignited is obviously increased over what is now possible, and less fuel is necessary to ignite this relatively pure mixture than one which is partly contaminated.

Another advantage is that the fresh scavenging air is relatively cool, and thus it not only cools the cylinder and piston walls somewhat, but by sweeping out the highly heated products of combustion which now mix with the fresh charge, will prevent pre-ignition and permit an engine with a higher compression ratio to be used with an additional increase in power.

A further advantage of my invention resides in the fact that since the fresh scavenging air is discharged through the ordinary exhaust passage of the engine and hence past the exhaust valves, such valves will be cooled and warping and burning of the same will be prevented. Also, the engine as a whole is kept cooler, making it easier to maintain the same properly lubricated and promoting smooth and easy running operation.

Summing up, therefore, I obtain greater power with less expenditure of fuel and improved engine operation generally, due to better cooling of the valves, lubricant, etc., and a longer period of operation without necessity of repairs.

These objects I accomplish by means of such structure and relative arrangement of parts as will fully appear by a perusal of the following specification and claim.

In the drawing similar characters of reference indicate corresponding parts in the several views:

Fig. 1 is a diagrammatic transverse section of my improved engine showing the piston on its first or fresh-air intake stroke.

Figure 2 is a similar view showing the piston on the second or fresh-air discharge stroke and just as the exhaust valve is about to open.

Figure 3 is a similar view showing the piston on the subsequent or third-mixture intake stroke; the left-hand portion of said view being shown in a plane beyond that of Figs. 1 and 2, or through the fuel mixture intake passage instead of through the exhaust passage as in Figs. 1 and 2.

Figure 4 is a diagram showing generally the opening periods of the several valves and their relationship to each other.

Referring now more particularly to the characters of reference on the drawing, essentially an engine constructed according to my invention comprises a cylinder 1 having a combustion chamber 2, a crankshaft 3, a piston 4, and a connecting rod 5 between the shaft and piston. The fuel mixture intake passage 6 leading to the chamber 2 has the usual poppet valve 7 interposed therein, actuated by a cam 8 on a camshaft 9 in the conventional manner. The exhaust passage 10 leading to chamber 2 also has the usual poppet valve 11 interposed therein, actuated by another cam 12 on the camshaft 9.

A fresh air intake passage 13 communicating with the chamber 2 is disposed in the cylinder head and a downwardly opening spring closed valve 14 normally closes this passage. This valve is opened against the resistance of the spring from a camshaft 15 disposed on the side of the engine opposite the camshaft 9 by suitable means, such as a tappet and push rod unit 16 actuated by a cam 17 on the camshaft 15, and a rocker arm 18 between the rod unit and valve, as is common practice in the operation of over-head valves.

The camshaft 9 also has another exhaust valve engaging cam 19, disposed in a predetermined circumferentially spaced relation to the cam 12, as will be seen later. The camshafts are driven from the crankshaft 3 by connecting gearing 20, which is arranged to rotate each cam shaft once for each three revolutions of the crankshaft. In other words, my engine operates on a six-stroke cycle instead of a four-stroke cycle, as is ordinarily the case.

On the first stroke of the cycle the air valve 14 opens and the accompanying downward movement of the piston draws fresh cool air into the cylinder and combustion chamber during the major portion of this stroke, as indicated in Fig. 4, cooling the interior surfaces with which it comes in contact. On the second stroke the exhaust valve 11 is opened by the cam 19 and the air just drawn in is forced out of the cylinder and through the exhaust passage 10 by the upward movement of the piston, thus cooling the exhaust valve and other parts in the path of such air. The residue of hot dead gas remaining in chamber 2 from the previous explosion is therefore forced out of the cylinder ahead of this air, so that at the end of the second stroke when the valve 11 closes, fresh air in a still relatively pure condition takes the place of and remains in the chamber 2 instead of the previous dead gaseous residue. The cam 19 is arranged so that the valve 11 is not opened until a certain upward movement of the piston has taken place, so that the fresh air charge will be compressed somewhat before being expelled. This prevents any possible back pressure from being set up in the cylinder by the products of combustion exhausting at that time into the exhaust manifold of the engine from another cylinder.

It will be seen, however, that except for the small period when the valve 11 remains closed and the air is being compressed, no power is consumed during these two strokes.

On the third stroke the intake valve 7 opens in the usual manner and for the usual period, drawing in a fresh mixture which thus mixes with the relatively pure air still remaining in the combustion chamber instead of being contaminated by the dead gases, as is now the case. On the fourth stroke the mixture is compressed and on the fifth stroke it is ignited, all the valves remaining closed during these two strokes, as is common practice. On the sixth and final stroke of the cycle the cam 12 opens the exhaust valve 11 so that the products of combustion are discharged.

It will therefore be seen that I retain the normal four stroke cycle of operation as in ordinary engines but add two clean-out or scavenging strokes to the cycle, which are interposed between the normal exhaust and intake strokes and which give the advantages in operation, power output and fuel consumption, as previously stated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A multiple-stroke cycle internal combustion engine including a cylinder and a reciprocating piston therein, fuel mixture intake, exhaust, and fesh air intake passages leading to the head of the cylinder, mixture intake, exhaust and air valves in the several passages, means including cams functioning upon movement of the piston through four successive strokes to operate the mixture intake valve and the exhaust valve so as to draw in and compress the mixture during the first two of such strokes and exhaust the same during the fourth stroke, means to open the air intake valve during the downward stroke of the piston immediately following the exhaust stroke whereby a charge of fresh air will be drawn into the cylinder and a cam to again open the exhaust valve during the succeeding upward movement of the piston but only after said air intake valve has closed and after the piston has moved upwardly a predetermined distance.

JOHN M. KROYER.